(12) United States Patent
Ueno et al.

(10) Patent No.: US 10,448,439 B2
(45) Date of Patent: Oct. 15, 2019

(54) WIRELESS COMMUNICATION APPARATUS, WIRELESS COMMUNICATION TERMINAL, WIRELESS COMMUNICATION SYSTEM, WIRELESS COMMUNICATION METHOD, AND WIRELESS COMMUNICATION PROGRAM

(71) Applicant: SEIKO EPSON CORPORATION, Tokyo (JP)

(72) Inventors: Taichi Ueno, Nagano (JP); Kenji Sakuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 94 days.

(21) Appl. No.: 15/784,566

(22) Filed: Oct. 16, 2017

(65) Prior Publication Data

US 2018/0152973 A1 May 31, 2018

(30) Foreign Application Priority Data

Nov. 28, 2016 (JP) .................................. 2016-229806

(51) Int. Cl.
*H04W 12/00* (2009.01)
*H04W 8/00* (2009.01)
(Continued)

(52) U.S. Cl.
CPC ........... *H04W 76/11* (2018.02); *G06F 21/608* (2013.01); *H04W 8/005* (2013.01); *H04W 12/0023* (2019.01); *H04W 12/04* (2013.01); *H04W 12/08* (2013.01); *H04W 48/12* (2013.01); *H04W 48/20* (2013.01); *G06F 21/44* (2013.01); *H04L 63/0876* (2013.01); *H04W 84/12* (2013.01); *H04W 84/18* (2013.01)

(58) Field of Classification Search
CPC ..... H04W 76/11; H04W 12/04; H04W 48/20; H04W 8/005; H04W 48/12; H04W 12/08; H04W 84/12; H04W 84/18; G06F 21/608; G06F 21/44; H04L 63/0876
See application file for complete search history.

(56) References Cited

U.S. PATENT DOCUMENTS

2007/0201389 A1 8/2007 Murayama
2012/0265913 A1* 10/2012 Suumaki ................. H04W 4/08
710/303
(Continued)

FOREIGN PATENT DOCUMENTS

JP 2007-228419 A 9/2007

*Primary Examiner* — Joseph E Dean, Jr.

(57) ABSTRACT

A wireless communication apparatus performing wireless communication with a terminal apparatus includes a regular connection control unit making connection to and performing communication with an external access point and a temporary connection control unit that makes connection to the terminal apparatus through an internal access point and receives connection setting information of the external access point from the terminal apparatus through wireless communication based on the connection. The identification information of the internal access point includes a first character string and a second character string, and the temporary connection control unit changes the second character string of the identification information when a predetermined condition is satisfied.

9 Claims, 3 Drawing Sheets

(51) Int. Cl.
*H04L 29/06* (2006.01)
*G06F 21/60* (2013.01)
*H04W 76/11* (2018.01)
*H04W 12/08* (2009.01)
*H04W 48/12* (2009.01)
*H04W 48/20* (2009.01)
*H04W 12/04* (2009.01)
*G06F 21/44* (2013.01)
*H04W 84/18* (2009.01)
*H04W 84/12* (2009.01)

(56) References Cited

U.S. PATENT DOCUMENTS

2017/0041860 A1* 2/2017 Ogawa .................. H04W 48/16
2017/0048696 A1* 2/2017 Kurihara ............... H04W 48/20

* cited by examiner

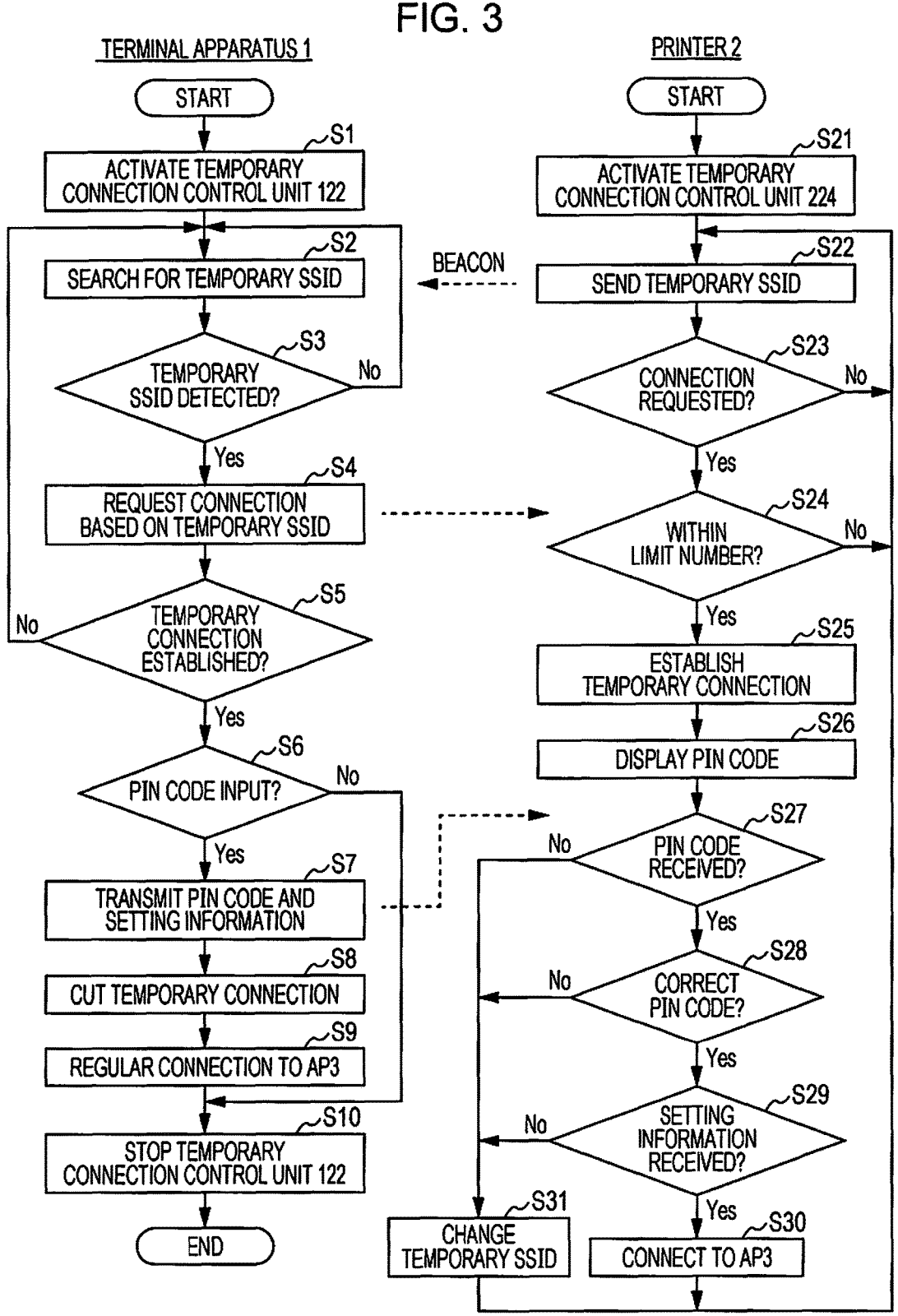

WIRELESS COMMUNICATION APPARATUS, WIRELESS COMMUNICATION TERMINAL, WIRELESS COMMUNICATION SYSTEM, WIRELESS COMMUNICATION METHOD, AND WIRELESS COMMUNICATION PROGRAM

BACKGROUND

1. Technical Field

The present invention relates to a wireless communication apparatus and the like that allow connection to be immediately established without being hindered by unnecessary connection and that realizes high user convenience.

2. Related Art

Widely used configurations include a configuration in which a terminal apparatus such as a personal computer and an electronic apparatus such as a printer are connected to each other through wireless communication. Such wireless communication between apparatuses is generally realized through an external access point. It is known that in order to establish such connection (regular connection), temporary direct wireless communication connection is first established between the apparatuses through wireless communication connection.

In this temporary connection, it is important that connection can be easily established and, hence, once connection is established between apparatuses, the apparatuses are configured to be automatically connected to each other after that. However, in such apparatuses, the number of apparatuses that can perform wireless communication at the same time is finite. Hence, there may be a case where, since connection to a communication party to which temporary connection is no more needed is continued, connection to a communication party to which temporary connection is needed for regular connection cannot be established.

Associated with such a problem, JP-A-2007-228419 discloses a technique in which temporary connection information (PIN code) is provided in addition to proper connection information (PIN code).

However, according to the method disclosed in JP-A-2007-228419, although the above problem is addressed by employing a configuration in which connection information is deleted by defining a validity period (for example, one day) for temporary connection information (PIN code), a user needs to input new connection information when new connection is made. Further, there may be a case in which unnecessary connection is not cut immediately, depending on the above-described validity period and, hence, quick response to necessary connection cannot be made.

SUMMARY

An advantage of some aspects of the invention is to provide a wireless communication apparatus or the like that can immediately establish connection without being disturbed by unnecessary connection and that enhances user convenience.

According to an aspect of the invention, in order to realize the advantage, a wireless communication apparatus performing wireless communication with a terminal apparatus includes: a regular connection control unit making connection to and wireless communication with an external access point; and a temporary connection control unit that makes connection to the terminal apparatus through an internal access point and receives connection setting information of the external access point from the terminal apparatus through wireless communication based on the connection. The identification information of the internal access point includes a first character string and a second character string, and the temporary connection control unit changes the second character string of the identification information when a predetermined condition is satisfied.

According to the aspect, connection to a terminal apparatus that needs temporary connection becomes possible by cutting unnecessary temporary connection.

According to a preferred aspect of the invention, the temporary connection control unit broadcasts authentication information after making connection to the terminal apparatus, and the predetermined condition includes that the temporary connection control unit does not receive the authentication information from the terminal apparatus.

With this aspect, necessary temporary connection can be made by cutting temporary connection to a terminal apparatus of a user who is not conscious of the connection.

Further, according to a preferred aspect of the invention described above, the predetermined condition includes that when the temporary connection control unit received the authentication information from the terminal apparatus, the temporary connection control unit does not receive the connection setting information from the terminal apparatus within a predetermined period of time from a predetermined point of time after the temporary connection control unit was connected to the terminal apparatus.

With this aspect, operation is possible even when there is a problem in that the battery of the terminal apparatus is, for example, dead.

In another preferred aspect of the invention, the wireless communication apparatus is a printer.

With this aspect, printing can be quickly performed from the terminal apparatus.

In order to realize the objectives described above, in another aspect of the present invention, a wireless communication terminal performing wireless communication with a wireless communication apparatus includes: a regular connection control unit that makes connection to and communication with an external access point existing outside the wireless communication apparatus; and a temporary connection control unit that makes connection to an internal access point of the wireless communication apparatus, and by using wireless communication based on the connection, transmits connection setting information of the external access point. Identification information of the internal access point includes a first character string and a second character string, and the temporary connection control unit, when detecting the identification information including the first character string, makes connection to the wireless communication apparatus by using the identification information.

With this aspect, regular connection to the wireless communication apparatus can be quickly and securely made. Further, user convenience at this time can be enhanced.

Further, in another preferred aspect of the present invention, the temporary connection control unit, after making connection to the internal access point, transmits input authentication information to the wireless communication apparatus.

With this aspect, it becomes possible to cut useless temporary connection in the wireless communication apparatus.

Further, in another preferred aspect of the present invention, a second character string of the identification information of the internal access point is changed.

With this aspect, it becomes possible to cut useless temporary connection in the wireless communication apparatus.

In order to realize the objectives described above, in another aspect of the present invention, in a wireless communication system including a wireless communication apparatus and a wireless communication terminal performing wireless communication between them, the wireless communication apparatus includes: a first regular connection control unit making connection to and performing communication with an external access point; and a first temporary connection control unit that makes connection to the wireless communication terminal through an internal access point and receives connection setting information of the external access point from the wireless communication terminal, through wireless communication based on the connection. The wireless communication terminal includes: a second regular connection control unit that makes connection to and performs wireless communication with the external access point; and a second temporary connection control unit that makes connection to the internal access point and, through wireless communication based on the connection, transmits the connection setting information of the external access point. Identification information of the internal access point includes a first character string and a second character string. The first temporary connection control unit changes the second character string of the identification information when a predetermined condition is satisfied. The second temporary connection control unit, upon detection of the identification information including the first character string, makes connection to the wireless communication apparatus by using the identification information.

With this aspect, it becomes possible to cut useless temporary connection in the wireless communication apparatus, and to establish necessary temporary connection to the wireless communication terminal. As a result, regular connection between the wireless communication terminal and the wireless communication apparatus can be established. Further, user convenience at this time can be enhanced.

In order to realize the objectives described above, in another aspect of the present invention, in a wireless communication method in a wireless communication apparatus performing wireless communication with a terminal apparatus, the method includes: making connection to the terminal apparatus through an internal access point and receiving, through wireless communication based on the connection, connection setting information of an external access point from the terminal apparatus; making connection to the external access point by using the connection setting information; and changing the second character string of the identification information of the internal access point including the first character string and the second character string when a predetermined condition is satisfied.

In order to realize the objectives described above, in another aspect of the present invention, in a wireless communication method in a wireless communication terminal performing wireless communication with a wireless communication apparatus, the method includes: making connection to an internal access point of the wireless communication apparatus and transmitting connection setting information of an external access point through wireless communication based on the connection, making connection to the external access point, and making, at the connection to the internal access point, upon detection of identification information including a first character string of the identification information of the internal access point including the first character string and a second character string, connection to the wireless communication apparatus by using the identification information.

In order to realize the objectives described above, in another aspect of the present invention, a wireless communication program causes a wireless communication terminal performing wireless communication with a wireless communication apparatus to execute: making connection to an internal access point of the wireless communication apparatus and transmitting connection setting information of the external access point through wireless communication based on the connection, and making connection to the external access point. At connection to the internal access point, regarding the identification information of the internal access point including a first character string and a second character string, when the identification information including the first character string is detected, connection to the wireless communication apparatus is made by using the identification information.

Further objectives and aspects of the invention will be clarified by embodiments of the invention described below.

BRIEF DESCRIPTION OF THE DRAWINGS

The invention will be described with reference to the accompanying drawings, wherein like numbers reference like elements.

FIG. 3 is a flowchart illustrating the steps of connection processing for wireless communication in the wireless communication system.

DESCRIPTION OF EXEMPLARY EMBODIMENTS

Figure 1:
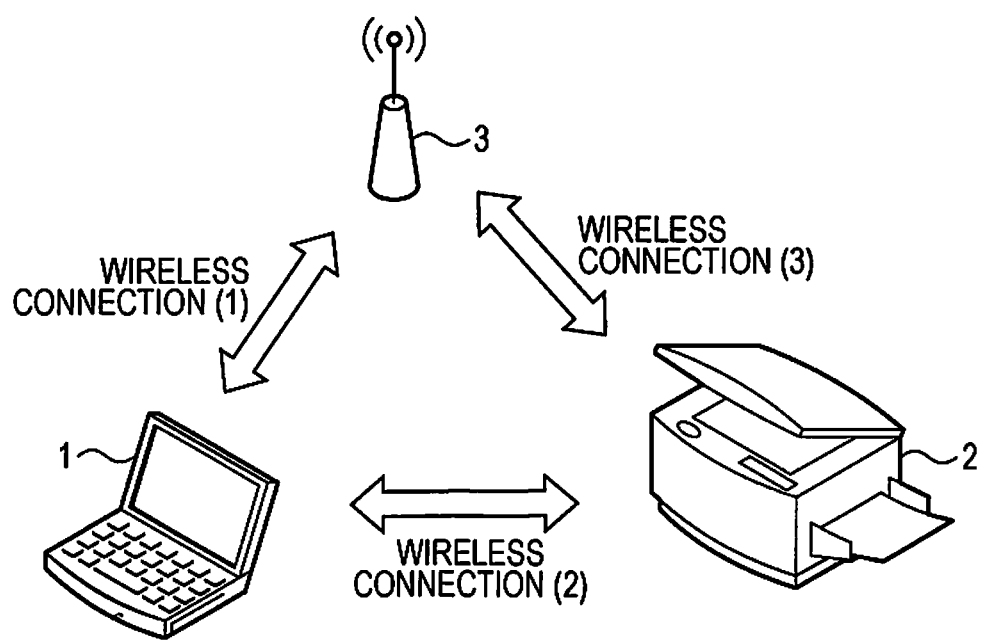
FIG. 1 is a schematic diagram of a wireless communication system to which the invention has been applied.

Hereinafter, embodiments of the invention will be described with reference to the drawings. However, these embodiments will not limit the technological scope of the invention. Note that in the figures identical or similar things are denoted by identical reference numerals or reference symbols in description.

Figure 2:
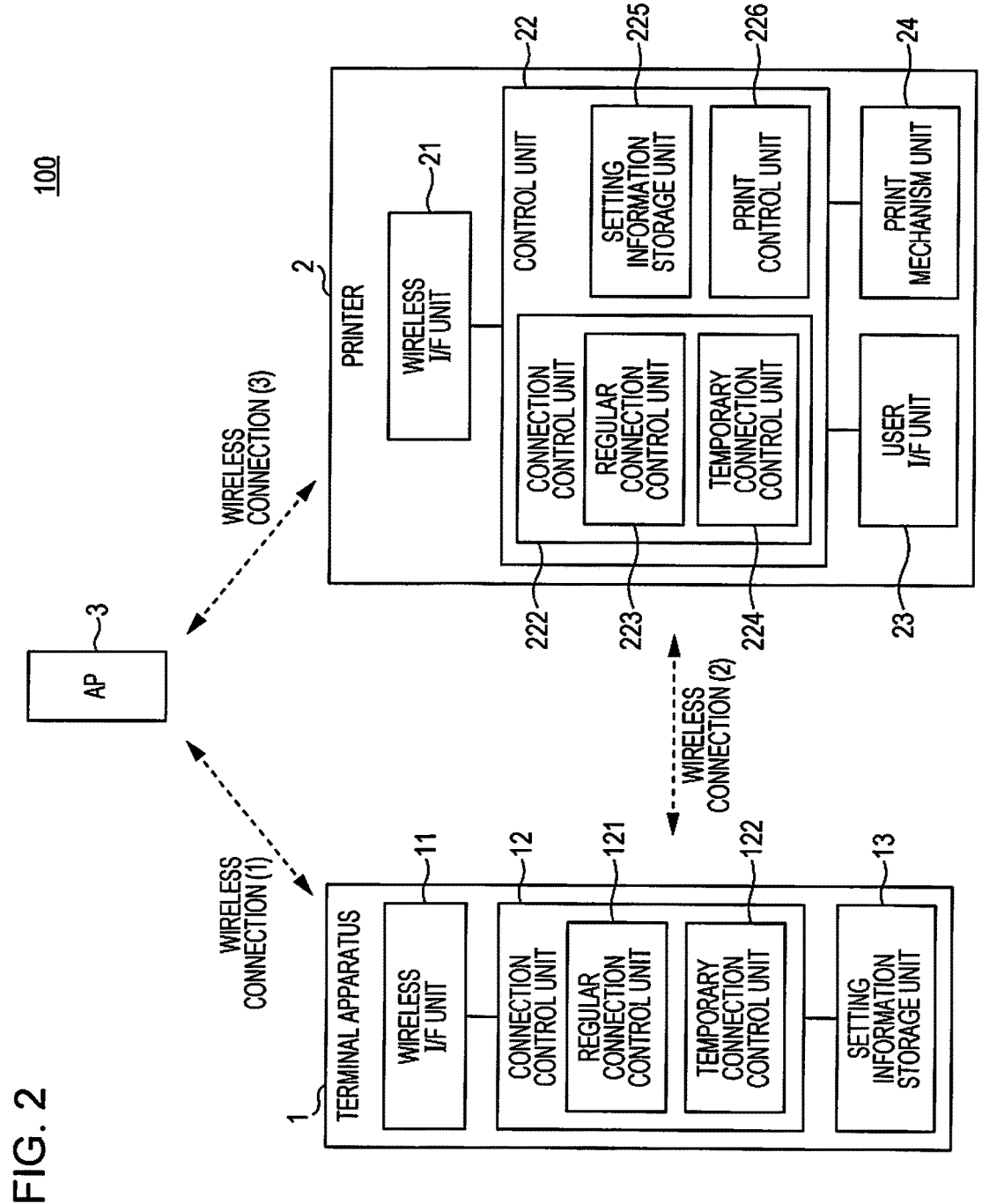
FIG. 2 is a function configuration diagram of the wireless communication system to which the invention has been applied.

FIG. 1 is a schematic diagram of a wireless communication system to which the invention has been applied. FIG. 2 is a function configuration diagram of the wireless communication system to which the invention has been applied. A wireless communication system 100 illustrated in FIG. 2 is a wireless communication system to which the invention has been applied, and includes a terminal apparatus 1 (wireless communication terminal) and a printer 2 (wireless communication apparatus). In the wireless communication system 100, when the terminal apparatus 1 is connected to an internal access point (AP) by using a Service Set Identifier (SSID) (hereinafter called a temporary SSID) that has a fixed part and a variable part, the printer 2 issues (displays) authentication information (for example, a PIN code). Then, when a predetermined condition is satisfied, for example, when the authentication information is not transmitted from the terminal apparatus 1 to the printer 2 within a predetermined time period, the printer 2 changes the variable part of the temporary SSID. Further, a temporary connection control unit 122 of the terminal apparatus 1, when detecting a beacon including the fixed part of the temporary SSID, makes connection to the printer 2 even when the variable parts of that temporary SSID and the stored temporary SSID are different from each other.

As a result of processing like this being performed, the wireless communication system 100 allows unnecessary connection (of which a user is not conscious) due to automatic connection to the printer 2 through an internal AP to be cut and allows necessary connection (connection which the user is conscious of and requesting) to be easily established.

Referring to FIG. 1 and FIG. 2, the terminal apparatus 1 and the printer 2 are wirelessly connected to each other and perform communication with each other. In other words, the two parties perform wireless communication with each other. During this wireless communication, wireless connection (wireless connection (1) and wireless connection (3) in FIG. 1 and FIG. 2)) through an AP 3 which is an external access point is made, and communication such as a print request from the terminal apparatus 1 to the printer 2 is performed. Such wireless connection through the AP 3 is called regular connection here.

The terminal apparatus 1 and the printer 2 have a function of making wireless connection (2) directly between them (wireless connection (2) in FIG. 1 and FIG. 2). The wireless connection (2) is made by using an internal AP (access point) activated within the printer 2. The wireless connection (2) is used to communicate information for regular connection between the terminal apparatus 1 and the printer 2 and is called temporary connection here.

The terminal apparatus 1 is a wireless communication terminal such as a personal computer or a smart phone having a wireless communication function and is a host apparatus of the printer 2 performing a print request to the printer 2. The terminal apparatus 1 includes a wireless I/F unit 11, a connection control unit 12, and a setting information storage unit 13 as function configurations, as illustrated in FIG. 2.

The wireless I/F unit 11, which is a wireless LAN interface for performing communication with another wireless communication apparatus in conformity with Wi-Fi Direct and the like, converts a received wireless signal in accordance with a protocol and sends it to an internal bus, and converts a signal received from the internal bus in accordance with the protocol and transmits it as a wireless signal. The wireless I/F unit 11 includes an antenna, an electronic circuit, a memory, and the like.

The connection control unit 12 controls the regular connection and temporary connection described above. Referring to FIG. 2, the connection control unit 12 includes a regular connection control unit 121 performing control of regular connection and the temporary connection control unit 122 performing control of temporary connection. The regular connection control unit 121 controls connection/disconnection of wireless communication to/from the AP 3, by using connection setting information (the SSID, security method, password, and the like of the AP 3) stored in the setting information storage unit 13. Note that the regular connection control unit 121 is formed of software such as an operating system (OS), a CPU operating in accordance with the software, a RAM, and the like.

The temporary connection control unit 122 controls connection/disconnection of wireless communication to/from the printer 2 by using connection setting information (temporary SSID or the like) of the internal AP of the printer 2 stored in the setting information storage unit 13. Note that the temporary connection control unit 122 is formed of software such as an application program (wireless communication program), a CPU operating in accordance with the software, a RAM, and the like. The application program is created by, for example, the manufacturer of the printer 2 and is installed in the terminal apparatus 1 through the Internet or from a recording medium such as a CD.

The setting information storage unit 13 is a storage apparatus such as a hard disk and a memory card storing the connection setting information for wireless connection described above. Specifically, the setting information storage unit 13 stores the connection setting information of AP3 (an SSID, a security method, a password, and the like) and the connection setting information (temporary SSID and the like) of the internal AP of the printer 2.

Here, the temporary SSID (identification information) is formed of a first character string and a second character string. The first character string is a fixed part that is always the same and the second character string is a variable part whose content changes at a predetermined timing. For example, the temporary SSID may be made to be "EPSON-WiFiSetup-xx", and in this case, "EPSON-WiFiSetup-" is the fixed part (first character string) and "xx" is the variable part (second character string). Hence, the variable part "xx" is modified at a predetermined timing.

Note that once wireless connection is established, the connection setting information is stored in this setting information storage unit 13, and the connection control unit 12 of the terminal apparatus 1, as an OS function, when the connection destination in that connection setting information enters an area where communication is possible, automatically performs wireless connection by using that connection setting information. In this case, connection is made when an SSID included in a beacon detected by the terminal apparatus 1 completely matches the SSID stored in the setting information storage unit 13.

Regarding the temporary SSID, when the application program described above has been installed, default character strings (a fixed first character string and a default second character string) are stored in the setting information storage unit 13.

The printer 2 is a printing apparatus including a wireless communication function. Hence, the printer 2 is one of wireless communication apparatuses. As illustrated in FIG. 2, the printer 2 includes a wireless I/F unit 21, a control unit 22, a user I/F unit 23, and a print mechanism unit 24.

The wireless I/F unit 21 is a wireless LAN interface for communicating with another wireless communication apparatus in conformance to, for example, Wi-Fi Direct, converts a received wireless signal in accordance with a protocol and transmits the signal to an internal bus, converts the signal taken out of the internal bus in accordance with a protocol and outputs the signal as a wireless signal. The wireless I/F unit 21 includes an antenna, an electronic circuit, a memory, and the like.

The control unit 22 is a controller for controlling the units of the printer 2. The control unit 22, upon receipt of a print request from a host apparatus such as the terminal apparatus 1, causes printing to be performed on a printing medium such as a sheet by controlling the print mechanism unit 24. Further, the control unit 22 controls regular connection and temporary connection made through the wireless I/F unit 21.

Referring to FIG. 2, the control unit 22 includes a connection control unit 222, a setting information storage unit 225, and a print control unit 226 as function configurations. The connection control unit 222 controls connection of wireless communication through the wireless I/F unit 21.

Referring to FIG. 2, the connection control unit 222 includes a regular connection control unit 223 controlling regular connection and a temporary connection control unit 224 controlling temporary connection. The regular connection control unit 223 controls connection/disconnection of wireless communication to/from the AP 3 by using connection setting information (the SSID of the AP 3, a security method, a password, and the like) stored in the setting information storage unit 225. Note that the regular connection control unit 223 is formed of a control program (firmware), a CPU operating in accordance with the program, a RAM, and the like.

The temporary connection control unit 224 controls wireless communication based on temporary connection to another apparatus such as the terminal apparatus 1. Specifically, the temporary connection control unit 224, at temporary connection, activates an internal AP and transmits the temporary SSID of the internal AP (transmits a beacon including the temporary SSID). Further, the temporary connection control unit 224, upon completion of the temporary connection, displays authentication information (Personal Identification Number (PIN) code) on the user I/F unit 23 and, then, changes the variable part of the temporary SSID when a predetermined condition is satisfied. Note that the temporary connection control unit 224 is formed of a control program (firmware) and a CPU operating in accordance with the program, a RAM, and the like.

The setting information storage unit 225 is a storage unit such as a non-volatile memory storing setting information for wireless connection. Specifically the setting information storage unit 225 stores the connection setting information (an SSID, a security method, a password, and the like) of the AP 3 and the connection setting information (temporary SSID) of the internal AP.

The print control unit 226 is a control unit causing print processing to be performed on the basis of print data received from a host apparatus such as the terminal apparatus 1. The print control unit 226 controls the print mechanism unit 24 in accordance with the command of print data and causes printing to be performed on a print medium. Note that the print control unit 226 includes a control program (firmware), a CPU performing processing in accordance with the control program, a RAM, a ROM, an application specific integrated circuit (ASIC) and the like.

The user I/F unit 23 is the user interface of the printer 2, and includes an operation apparatus such a button, a display apparatus such as an LCD display, and the like.

The printing mechanism unit 24 performs printing on a print medium (sheet and the like) in accordance with an instruction from the print control unit 226. The print mechanism unit 24 includes a print head, a print medium conveyance apparatus, and the like.

The wireless communication system 100 according to an embodiment of the invention having the configuration described above is characterized by connection processing for wireless communication. Hereinafter, the processing details will be described.

FIG. 3 is a flowchart illustrating the steps of connection processing for wireless communication in the wireless communication system 100. Hereinafter, description will be made on the basis of FIG. 3. In this description, it is assumed that wireless connection (1) has already been established between the terminal apparatus 1 and AP3 and the connection setting information of the AP 3 has been stored in the setting information storage unit 13. It is assumed that the printer 2 is in a state in which connection setting information of AP3 has not been stored in the setting information storage unit 225. Processing in which the terminal apparatus 1 performs regular connection to the printer 2 in a state described above will be described below. Note that together with this, the content of processing performed by the printer 2 for a terminal apparatus other than the terminal apparatus 1 will also be described, where the terminal apparatus has been temporarily connected to the printer 2.

First, a user who is going to establish regular connection to the printer 2 activates the temporary connection control unit 122 of the terminal apparatus 1 and the temporary connection control unit 224 of the printer 2 (step S1 and step S21 in FIG. 3). Specifically, the user activates an application program of the temporary connection control unit 122 installed in the terminal apparatus 1 and performs an operation for requesting wireless connection. The user activates the internal AP through operation of the user I/F unit 23 of the printer 2.

Next, in the terminal apparatus 1, the activated temporary connection control unit 122 starts to search for a temporary SSID through a wireless I/F (step S2 in FIG. 3). On the other hand, the temporary connection control unit 224 of the printer 2 sends (delivers) a beacon including a temporary SSID (step S22 in FIG. 3).

After that, the temporary connection control unit 122 of the terminal apparatus 1 waits for detection (discovery) of a temporary SSID whose fixed part matches that of the temporary SSID stored in the setting information storage unit 13 (No in step S3 in FIG. 3) and, when such a temporary SSID is detected (Yes in step S3 of FIG. 3), requests connection by using the acquired temporary SSID (step S24 in FIG. 3).

On the other hand, the temporary connection control unit 224 of the printer 2 waits for receipt of the request for connection (No in step S23 in FIG. 3). When the request for connection is received (Yes in step S23 in FIG. 3), it is determined whether or not, even after temporary connection of this time has been made, the number of temporary connections (the number of external apparatuses for which temporary connection has been established) at that time is within a limit number (step S24 in FIG. 3). The limit number has been determined in advance and may be 1, for example.

When the number of temporary connections is within the limit number (Yes in step S24 in FIG. 3), the temporary connection control unit 224 of the printer 2 establishes temporary connection to the terminal apparatus 1 which requested connection (step S25 in FIG. 3). When the limit number is one, the temporary connection to the terminal apparatus 1 is established when temporary connection to another external connection has not been established. On the other hand, when the number of temporary connections is not within or equal to the limit number (No in step S24 in FIG. 3), the process returns to step S22, and waits until temporary connection to another apparatus is cut.

The temporary connection control unit 224 of the printer 2, when a temporary connection is established, notifies a user of a PIN code (authentication information). Specifically, the temporary connection control unit 224 displays the PIN code on a user I/F unit (step S26 in FIG. 3).

On the other hand, in the terminal apparatus 1, a temporary connection control unit 112, after requesting temporary connection, waits for temporary connection to be established (No in step S5, steps S2-S4), and when the temporary connection is established (Yes in step S5 in FIG. 3), waits for input of a PIN code (step S6 in FIG. 3).

The user described above has intention of making regular connection and, hence, by looking at the PIN code displayed by the temporary connection control unit 224 of the printer 2, inputs the PIN code into the terminal apparatus 1. The temporary connection control unit 122 of the terminal apparatus 1, which waits for input of a PIN code when temporary connection has been established, displays a screen for the PIN code input on a display unit (not illustrated) of the terminal apparatus 1, and the user inputs the above-described PIN code by using the screen.

When a PIN code is not input to the terminal apparatus 1 for a predetermined time due to some reason (No in step S6 in FIG. 3), the process proceeds to step S10 and the temporary connection control unit 122 stops operating.

On the other hand, when a PIN code is input to the terminal apparatus 1 (Yes in step S6 in FIG. 3), the temporary connection control unit 122 transmits the input PIN code to the printer 2 by using the established temporary connection. After that, the temporary connection control unit 122 transmits connection setting information for AP3 to be stored in the setting information storage unit 13 to the printer 2 by using the temporary connection (wireless connection (2)) (step S7 in FIG. 3).

After that, the temporary connection control unit 122 cuts the temporary connection (step S8 in FIG. 3).

Next, the temporary connection control unit 122 requests the regular connection control unit 121 of the terminal apparatus 1 to perform regular connection and the regular connection control unit 121 performs regular connection (wireless connection (1)) to the AP 3 through the wireless I/F unit 11 (step S9 in FIG. 3). In this regular connection, connection setting information for the AP 3 stored in the setting information storage unit 13 is used.

After that, the temporary connection control unit 122 stops operating (step S10 in FIG. 3). This is the end of processing on the terminal apparatus 1 side.

On the other hand, on the printer 2 side, after the display of PIN code, it is determined whether or not predetermined conditions are satisfied, and when the predetermined conditions are not satisfied, processing for changing the temporary SSID is performed.

Here, the predetermined conditions are conditions that are shown in steps S27, S28, and S29 in FIG. 3, and hereinafter, processing for changing the temporary SSID will be specifically described.

The temporary connection control unit 224 of the printer 2, after display of a PIN code, determines whether or not the PIN code is received in temporary connection (wireless communication (2)) (step S27 in FIG. 3). Here, when the PIN code is not received even after a predetermined period of waiting time (No in step S27 in FIG. 3), the process proceeds to step S31 and the temporary SSID is changed. Hence, one of the predetermined conditions described above is that a PIN code is not received during a predetermined period of time.

On the other hand, when the PIN code is received during the predetermined period of time (Yes in step S27 in FIG. 3), the temporary connection control unit 224 confirms whether or not the received PIN code is correct (step S28 in FIG. 3). When the received PIN code is not correct according to the confirmation (No in step S28 in FIG. 3), the process proceeds to step S31 and the temporary SSID is changed. Hence, one of the predetermined conditions described above is that the received PIN code is not a correct PIN code. Here, the correct PIN code is the PIN code displayed by the temporary connection control unit 224 in step S26.

On the other hand, when the received PIN code is correct (Yes in step S28 in FIG. 3), the temporary connection control unit 224 confirms whether or not, within the predetermined period of time from a predetermined point of time when the temporary connection control unit 224 was connected to the terminal apparatus 1, the temporary connection control unit 224 received the AP3 connection setting information from the terminal apparatus 1 through temporary connection (wireless connection (2)) (step S29 in FIG. 3). When the AP3 connection setting information was not received during the predetermined time according to the confirmation result (No in step S29 in FIG. 3), the process proceeds to step S31, and the temporary SSID is changed. Hence, one of the predetermined conditions described above is that AP3 connection setting information is not received during a predetermined time after the temporary connection control unit 224 is connected to the terminal apparatus 1. Note that, after the temporary connection control unit 224 has been connected to the terminal apparatus 1, the predetermined point of time described above may be a point of time when the temporary connection control unit 224 was connected to the terminal apparatus 1, or may be a point of time when the temporary connection control unit 224 confirmed that the received PIN code is correct.

On the other hand, when the AP3 connection setting information has been received during the predetermined period of time (Yes in step S29 in FIG. 3), the temporary connection control unit 224 delivers the received AP3 connection setting information to the regular connection control unit 223, and the regular connection control unit 223 performs regular connection (wireless connection (3)) by using the connection setting information (step S30 in FIG. 3). Then, the process proceeds to step S22. Note that, in this case, the temporary connection control unit 224 may be made to stop operating instead of proceeding to step S22.

When the process proceeds to step S31, as described above, the temporary connection control unit 224 performs processing for changing the temporary SSID. Specifically, the temporary connection control unit 224 changes the variable part of the temporary SSID. For example, when the temporary SSID is "EPSON-WiFiSetup-xx", "EPSON-WiFiSetup-" is a fixed part, and "xx" is a variable part, the variable part "xx" is changed, for example, to "yy". After the changing processing, the process proceeds to step S22.

In this case, the temporary connection established by the temporary SSID prior to the change is cut, the temporary SSID subsequent the change is sent, and new temporary connection becomes established on the basis of the temporary SSID subsequent to the change.

Since the terminal apparatus 1, as described above, is operated by a user who is going to perform regular connection, that is, since the user is aware of the fact that temporary connection has been made, when the user inputs the PIN code (step S26) displayed on the printer 2 without an error (Yes in step S6), the process proceeds in sequence from Yes in step S27, Yes in step S28, and to Yes in step S29, whereby the regular connection is made (S30) as described above.

When there exists, other than the terminal apparatus 1, a terminal apparatus (external apparatus) 1A which established temporary connection to the printer 2 in the past within the wirelessly connectable range of the printer 2, even when the user of the apparatus does not intentionally activate a temporary connection control unit 122A, the connection control unit 12A automatically performs temporary connection to the printer 2 as a function of the OS. In such a case, the user, who is not conscious of this, does not input to the terminal apparatus 1A the PIN code displayed on the terminal apparatus 1A in step S26. Hence, in this case, the process proceeds to step S31 and the temporary SSID is changed. After that, the temporary connection based on the original temporary SSID is cut. In the terminal apparatus 1A, since the temporary connection control unit 122 has not been activated, with the function of the OS that makes connection on the basis of complete matching between the SSIDs, temporary connection to the temporary SSID subsequent to the change is not made. Consequently, unnecessary temporary connection which the user is not conscious of is cut.

As described above, when a user is conscious of making connection, the temporary connection control unit 122 has been activated and, hence, even when the SSID is changed, since the fixed part does not change, temporary connection is made. Hence, even when temporary connection of the terminal apparatus 1 to which the user intentionally makes regular connection cannot be made (No in step S24) due to the limit in number described above, owing to processing described on the basis of FIG. 3, as described above, unnecessary temporary connection is cut, thereby clearing limit on the number, and the terminal apparatus 1 issues a temporary request even for a modified temporary SSID. Hence, necessary temporary connection which the user is conscious of becomes possible.

Further, when another printer having similar functions as the printer 2 exists near the printer 2, also when a PIN code displayed by the other printer is transmitted to the printer 2, the condition of step S28 in FIG. 3 is satisfied, that is, the SSID transmitted from the terminal apparatus 1 is not correct and, hence, the temporary SSID will be changed.

Further, for example, even in the case where the power of the terminal apparatus 1 is out and connection setting information for AP3 cannot be transmitted after the transmission (S7) of a PIN code, the temporary SSID will be changed since the condition for step S29 in FIG. 3 is satisfied, that is, since connection setting information is not received in the printer 2.

As described above, in the wireless communication system 100 according to the present embodiment, if a predetermined condition is satisfied after the printer 2 performed temporary connection, the variable part of a temporary SSID is changed. Further, when a temporary SSID whose fixed part matches that of the stored temporary SSID is detected, the temporary connection control unit 122 of the terminal apparatus 1 requests for temporary connection using the detected temporary SSID. Hence, unnecessary temporary connection to a terminal apparatus in which the temporary connection control unit 122 has not been activated can be cut, and necessary temporary connection to the terminal apparatus 1 can be made. Further, in the wireless communication system 100, a user operation on temporary connection itself using a changed temporary SSID is not required and user convenience is enhanced.

Further, the predetermined conditions described above include a condition that a PIN code displayed by the printer 2 is not transmitted from the terminal apparatus 1, that is, the PIN code is not manually input to the terminal apparatus 1 and unnecessary temporary connection which a user is not conscious of can be reliably cut.

Further, in this way, unnecessary temporary connection is avoided and regular connection between the printer 2 and the terminal apparatus 1 which is going to use the printer 2 can be immediately made and, hence, the terminal apparatus 1 can immediately make the printer 2 perform printing, whereby user convenience is enhanced.

Note that although the wireless communication apparatus is a printer in the present embodiment, the invention can be applied to other wireless communication apparatuses including a wireless communication function, for example, a scanner, a multifunction printer, a projector, and the like.

Note that various types of processing performed by the control unit 22, the connection control unit 222, the regular connection control unit 223, the temporary connection control unit 224, the print control unit 226 and the like according to the present embodiment may be performed by the CPU, or may be performed by another electronic component (for example, ASIC). Further, various types of processing performed by the control unit 22, the connection control unit 222, the regular connection control unit 223, the temporary connection control unit 224, the print control unit 226, and the like may be performed by a plurality of CPUs in a distributed processing manner, or may be performed by collaborative operation of a CPU and electronic components (for example, ASICs).

The protection range of the invention is not limited to the embodiments described above, and extends to the invention disclosed in the Claims and their equivalents.

The entire disclosure of Japanese Patent Application No. 2016-229806, filed Nov. 28, 2016 is expressly incorporated by reference herein.

What is claimed is:

1. A wireless communication apparatus performing wireless communication with a terminal apparatus, comprising:
   a regular connection control unit making connection to and performing wireless communication with an external access point; and
   a temporary connection control unit that makes a temporary connection to the terminal apparatus through an internal access point and receives connection setting information of the external access point from the terminal apparatus through wireless communication based on the temporary connection,
   wherein the identification information of the internal access point includes a first character string and a second character string,
   wherein the temporary connection control unit informs a user of authentication information after making the temporary connection to the terminal apparatus, and
   wherein the temporary connection control unit changes the second character string of the identification information in response to the temporary connection control unit determining that the temporary connection control unit does not receive the authentication information from the terminal apparatus through the wireless communication based on the temporary connection.

2. The wireless communication apparatus according to claim 1,
   wherein the temporary connection control unit changes the second character string of the identification information in response to the temporary connection control determining that when the temporary connection control unit received the authentication information from the terminal apparatus, the temporary connection control unit does not receive the connection setting information from the terminal apparatus within a predetermined period of time from a predetermined point of time after the temporary connection control unit was connected to the terminal apparatus.

3. The wireless communication apparatus according to claim 1,
   wherein the wireless communication apparatus is a printer.

4. A wireless communication terminal performing wireless communication with a wireless communication apparatus, the terminal comprising:

a regular connection control unit that makes connection to and communication with an external access point existing outside the wireless communication apparatus; and a temporary connection control unit that makes a temporary connection to an internal access point of the wireless communication apparatus, and by using wireless communication based on the temporary connection, transmits connection setting information of the external access point, wherein identification information of the internal access point includes a first character string and a second character string, wherein the temporary connection control unit, when detecting the identification information including the first character string, makes the temporary connection to the wireless communication apparatus by using the identification information, and wherein the temporary connection control unit, after making the temporary connection to the internal access point, transmits input authentication information to the wireless communication apparatus by using the wireless communication based on the temporary connection.

5. The wireless communication terminal according to claim 4, wherein a second character string of the identification information of the internal access point is changed.

6. A wireless communication system including a wireless communication apparatus and a wireless communication terminal performing wireless communication between them, wherein the wireless communication apparatus includes:

a first regular connection control unit making connection to and performing communication with an external access point; and a first temporary connection control unit that makes a temporary connection to the wireless communication terminal through an internal access point and receives connection setting information of the external access point from the wireless communication terminal, through wireless communication based on the temporary connection, wherein the wireless communication terminal includes:

a second regular connection control unit that makes connection to and performs wireless communication with the external access point; and a second temporary connection control unit that makes a temporary connection to the internal access point and, through wireless communication based on the temporary connection, transmits the connection setting information of the external access point, wherein identification information of the internal access point includes a first character string and a second character string, wherein the first temporary connection control unit informs a user of authentication information after making the temporary connection to the wireless communication terminal, wherein the first temporary connection control unit changes the second character string of the identification information in response to the first temporary connection control unit determining that the first temporary connection control unit does not receive the authentication information from the wireless communication terminal through the wireless communication based on the temporary connection, wherein the second temporary connection control unit, upon detection of the identification information including the first character string, makes the temporary connection to the wireless communication apparatus by using the identification information, and wherein the second temporary connection control unit, after making the temporary connection to the internal access point, transmits input authentication information to the wireless communication apparatus by using the wireless communication based on the temporary connection.

7. A wireless communication method in a wireless communication apparatus performing wireless communication with a terminal apparatus, the method comprising:

making a temporary connection to the terminal apparatus through an internal access point and receiving, through wireless communication based on the temporary connection, connection setting information of an external access point from the terminal apparatus;

making connection to the external access point by using the connection setting information;

informing a user of authentication information after making the temporary connection to the terminal apparatus; and changing the second character string of the identification information of the internal access point including the first character string and the second character string in response to determining that the authentication information is not received from the terminal apparatus through the wireless communication based on the temporary connection.

8. A wireless communication method in a wireless communication terminal performing wireless communication with a wireless communication apparatus, the method comprising:

making a temporary connection to an internal access point of the wireless communication apparatus and transmitting connection setting information of an external access point through wireless communication based on the temporary connection, making connection to the external access point, making, at the temporary connection to the internal access point, upon detection of identification information including a first character string of the identification information of the internal access point including the first character string and a second character string, the temporary connection to the wireless communication apparatus by using the identification information, and after making the temporary connection to the internal access point, transmitting input authentication information to the wireless communication apparatus by using the wireless communication based on the temporary connection.

9. A non-transitory computer readable storage medium recording a wireless communication program causing a wireless communication terminal performing wireless communication with a wireless communication apparatus to make:

a temporary connection to an internal access point of the wireless communication apparatus and transmission of connection setting information of the external access point through wireless communication based on the temporary connection, the temporary connection to the wireless communication apparatus, upon detection of the identification information including a first character string of the identification information of the internal access point including the first character string and a second character string, by using the identification information, and causing the wireless communication terminal to transmit, after making the temporary connection to the internal access point, input authentication information to the wireless communication apparatus by using the wireless communication based on the temporary connection.

\* \* \* \* \*